(No Model.)

P. MILES.
BOTTLE STOPPER.

No. 257,042. Patented Apr. 25, 1882.

Witnesses
Chas. H. Smith
J. Hail

Inventor
Purches Miles
per Lemuel W. Serrell
atty

UNITED STATES PATENT OFFICE.

PURCHES MILES, OF BROOKLYN, NEW YORK.

BOTTLE-STOPPER.

SPECIFICATION forming part of Letters Patent No. 257,042, dated April 25, 1882.

Application filed March 1, 1882. (No model.)

*To all whom it may concern:*

Be it known that I, PURCHES MILES, of Brooklyn, in the county of Kings and State of New York, have invented an Improvement in Bottle-Stoppers, of which the following is a specification.

I make use of a lever with a cylindrical hub passing into an eye or eyes upon the stopper-body, and there is an eccentric hole through the hub for the passage of the bail-wire, so that when the said lever is moved in one direction the eccentricity of the hub, as it is turned upon the bail-wire, will cause the stopper to be forced down to the bottle, and when moved the other way the bottle-stopper will be relieved.

Figure 1:
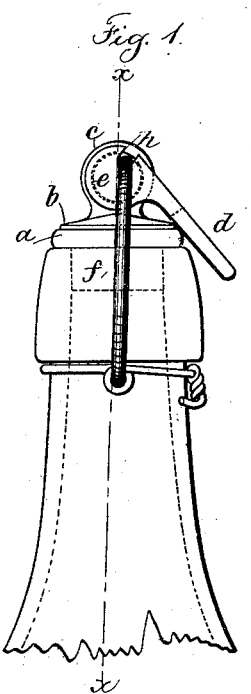
Figure 5:
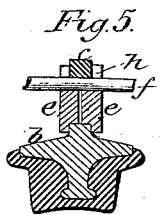
Figure 3:
Figure 2:
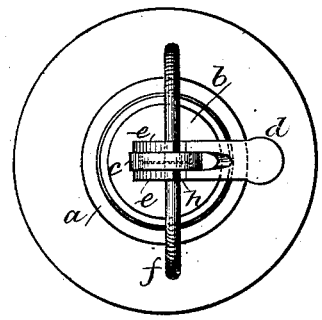
Figure 4:
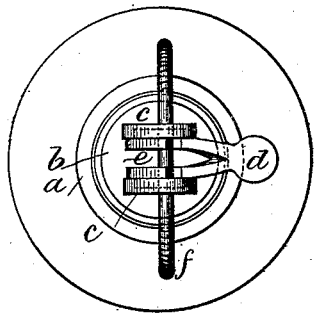

In the drawings, Figure 1 is a side view of the stopper. Fig. 2 is a plan; Fig. 3, a plan of a modification in the form of the lever-hub. Fig. 4 shows the same as applied to the stopper, and Fig. 5 is a cross-section of the stopper at the line $x$ $x$.

The elastic stopper $a$ and metal body $b$ are of any desired form. Upon the body $b$ there are one or two rings or loops, $c$, of a circular form. One ring is shown in Figs. 1 and 2 and two rings in Fig. 4. The lever $d$ is made with a cylindrical hub, $e$, with an eccentric hole, $h$, through which passes the bail-wire $f$, the lower ends of such bail-wire being pivoted to the neckband or neck in any of the known forms. The opening $h$ in the hub $e$ for the bail-wire is not central, but it is at or near one edge of the hub. I prefer to form such opening $h$ as a slot, into which the bail-wire is introduced after the bail has been passed through the circular loops $c$ upon the stopper-body. The hub is cylindrical and adapted to pass inside the circular ring-loop $c$. It is also in two parts and made of metal, preferably malleable cast-iron. There are flanges around the two parts of the hub adapted to set against the sides of the loop $c$. When only one loop $c$ is used, as in Figs. 1 and 2, the two parts of the hub will be separated sufficiently to allow them to be placed at the outside, of the single circular loop $c$, after the bail-wire has been threaded through such loop $c$, and the hubs will by their notched edges receive the bail-wire, after which the two parts of the hub will be pressed toward each other and grasp the ring or loop $c$ between them. In this manner the parts will be connected; but the lever can be moved and the hubs turned around within such loop $c$, and in so doing the hub will press the stopper into the bottle, the bail-wire becoming the axis around which such eccentric cylindrical hub is turned, and the notch $h$ in the hub occupies such a position in relation to the lever that when said lever is depressed the bail will be moved slightly beyond a vertical line. Hence any pressure upon the stopper will not tend to turn the hub in a direction to raise the stopper.

In Figs. 3 and 4 the two-part cylindrical hub is shown with the flanges near the middle, so that it may be placed between the two ring-loops $c$ $c$ and the parts of the hub pried apart or separated sufficiently to cause the same to enter into the said ring-loops. The parts will act, as before described, in closing the stopper; and it is to be understood that the reverse movement will withdraw the stopper.

I do not claim a ring upon a lever to which the bail is connected and which acts as an eccentric in closing the bottle-stopper.

I claim as my invention—

1. The combination, with the stopper, the bail, and the lever, of a ring-loop upon the stopper and a hub upon the lever entering such ring-loop and having an opening for the bail, substantially as set forth.

2. The combination, with the bail, the stopper, and the lever, of a ring-loop upon the stopper, through which the bail passes, and a cylindrical hub with an eccentric opening upon the lever within such ring-loop, substantially as set forth.

3. The combination, with the bail and stopper, of a lever having a two-part hub through which the bail passes eccentrically, and a ring-loop upon the stopper, substantially as set forth.

Signed by me this 24th day of February, A. D. 1882.

PURCHES MILES.

Witnesses:
GEO. T. PINCKNEY,
HAROLD SERRELL.